US010518851B2

(12) United States Patent
Corl et al.

(10) Patent No.: US 10,518,851 B2
(45) Date of Patent: Dec. 31, 2019

(54) UNDERSEA COMPASS AND PITCH INDICATOR

(71) Applicant: Teledyne Brown Engineering, Inc., Thousand Oaks, CA (US)

(72) Inventors: Kenneth C. Corl, Owens Cross Roads, AL (US); Roger Dooley, Winchester, TN (US); Catherine Alofs, Huntsville, AL (US); Scott D. Silvey, Harvest, AL (US)

(73) Assignee: TELEDYNE BROWN ENGINEERING, INC., Thousand Oaks, CA (US)

( * ) Notice: Subject to any disclaimer, the term of this patent is extended or adjusted under 35 U.S.C. 154(b) by 0 days.

(21) Appl. No.: 15/906,403

(22) Filed: Feb. 27, 2018

(65) Prior Publication Data
US 2019/0263487 A1  Aug. 29, 2019

(51) Int. Cl.
*B63B 49/00* (2006.01)
*G01C 23/00* (2006.01)
(Continued)

(52) U.S. Cl.
CPC .............. *B63B 49/00* (2013.01); *B63B 39/00* (2013.01); *G01C 21/20* (2013.01); *G01C 23/00* (2013.01);
(Continued)

(58) Field of Classification Search
CPC ................................ B63B 39/00; B63B 49/00
See application file for complete search history.

(56) References Cited

U.S. PATENT DOCUMENTS

2003/0056786 A1* 3/2003 Hollis ..................... B63C 11/02
128/201.27
2005/0200502 A1* 9/2005 Reusser ................. G01C 23/00
340/973
(Continued)

FOREIGN PATENT DOCUMENTS

CN          104101360 A      10/2014

OTHER PUBLICATIONS

Combined Search and Examination Report under Sections 17 & 18(3) dated Jul. 30, 2019 by the Intellectual Property Office of the United Kingdom in Application No. 1901398.6.

*Primary Examiner* — Laura N Nguyen
(74) *Attorney, Agent, or Firm* — K&L Gates LLP

(57) ABSTRACT

Disclosed are a system and method for undersea navigation with a maritime vehicle or diver undersea navigation device. A sensor interface receives navigation information from a plurality of sensors used to sense navigation information. A processor receives the navigation information from the sensor interface. The processor converts the navigation information into graphics data. The processor provides the graphics data to a graphics processing unit to render a navigation board image on a display of the maritime vehicle or diver undersea navigation device. The navigation board image comprises a plurality of navigation indicators to indicate the navigation information and a compass comprising a plurality of rotational orientation indicators to indicate rotational orientation information. The rotational orientation indicators include a plurality of heading direction indicators, a current heading indicator, and a plurality of pitch indicators, where the plurality of pitch indicators indicate pitch information.

20 Claims, 13 Drawing Sheets

(51) Int. Cl.
  *B63B 39/00* (2006.01)
  *G01C 21/20* (2006.01)
  *G01C 17/00* (2006.01)
  *G01S 15/93* (2006.01)
  *G01P 5/00* (2006.01)
(52) U.S. Cl.
  CPC ............... *G01C 17/00* (2013.01); *G01P 5/00* (2013.01); *G01S 15/93* (2013.01)

(56) References Cited

U.S. PATENT DOCUMENTS

| | | | |
|---|---|---|---|
| 2007/0006472 A1* | 1/2007 | Bauch | G01C 17/00 33/355 R |
| 2007/0014189 A1 | 1/2007 | Basilico | |
| 2007/0018887 A1 | 1/2007 | Feyereisen et al. | |
| 2013/0218373 A1* | 8/2013 | Hedrick | B60K 37/02 701/14 |
| 2014/0100775 A1* | 4/2014 | Souza | G01C 17/28 701/494 |
| 2015/0029017 A1* | 1/2015 | Thoreson | B60K 35/00 340/461 |
| 2015/0332101 A1* | 11/2015 | Takaki | B60R 1/00 382/104 |
| 2017/0030730 A1* | 2/2017 | Boschker | G01C 21/32 |
| 2017/0349259 A1* | 12/2017 | Kabel | B63B 49/00 |
| 2018/0130377 A1* | 5/2018 | Meess | B23K 9/1093 |
| 2019/0054989 A1* | 2/2019 | Hulbert | B63B 22/06 |
| 2019/0127082 A1* | 5/2019 | Oltheten | B64D 45/08 |

* cited by examiner

UNDERSEA COMPASS AND PITCH INDICATOR

TECHNICAL FIELD

This disclosure is generally related to undersea navigation techniques. More particularly, this disclosure is related to rendering an integrated navigation board image comprising a transparent compass, navigation indicators, and rotational orientation indicators.

BACKGROUND

Underwater navigation graphical user interfaces (GUIs), such as navigation board images rendered by a graphics processing unit on a display, can be configured to emphasize the existence of dangerous conditions to users. These underwater navigation GUIs are usable on the displays of a variety of maritime vehicles, navigation boards or diver propulsion devices. Additionally, such interfaces can be configured to improve the situational awareness of users.

The navigation board images on such interfaces may integrate rotational information with navigation information. A transparent compass in a navigation board image can indicate ascent and descent information relative to the current location, bearing and surroundings of the corresponding maritime vehicle. The transparent compass may also indicate roll information relative to the current location, bearing and surroundings of the corresponding maritime vehicle.

Ascent and descent information relative to the current location of the maritime vehicle in the water column can be used to determine that a current ascent rate, descent rate, or water depth indicates the trajectory of the maritime vehicle or user is unviable. The transparent compass may indicate the criticality of this unviable ascent rate, descent rate, or water depth using a color of the corresponding rotational orientation indicator. The color may be changed to a different shade or to a different color altogether to indicate closer progression to the unviable threshold. When the unviable threshold is exceeded, significant medical risks to the user or others in the vicinity of the user can be present.

The transparent compass and sonar screen or map may be used together in a navigation board image to highlight other dangerous conditions. The transparent compass can be oriented relative to the location of the user or maritime vehicle on the navigation board image. In this way, the user may identify an object or event and directly and accurately navigate the user or maritime vehicle to the identified object or event using the sonar or map in conjunction with the compass. The relative orientation of the user or maritime vehicle to the identified object or event can be determined using the combined sonar or map and compass.

SUMMARY

In one aspect, an undersea navigation system for use with a maritime vehicle is provided. The system comprises a sensor interface to receive navigation information from a plurality of sensors configured to sense the navigation information; a display; a graphics processing unit coupled to the display; a processor coupled to the graphics processing unit; and a memory coupled to the processor, the memory storing instructions executable by the processor to: receive the navigation information from the plurality of sensors; and convert the navigation information into graphics data; and provide the graphics data to the graphics processing unit to render a navigation board image on the display, wherein the navigation board image comprises: a plurality of navigation indicators to indicate the navigation information, and a compass comprising a plurality of rotational orientation indicators to indicate rotational orientation information.

In another aspect, a method of undersea navigation with a maritime vehicle is provided. The method comprises receiving, by a processor coupled to a memory storing instructions executed by the processor, navigation information of the maritime vehicle from a plurality of sensors sensing navigation information; determining, by the processor, rotational orientation information of the maritime vehicle based on sensed navigation information; associating, by the processor, the rotational orientation information with navigation information displayed by the plurality of navigation indicators; converting, by the processor, the navigation information into graphics data; and providing, by the processor, the graphics data to a graphics processing unit to render a navigation board image on a display coupled to the graphics processing unit, wherein the navigation board image comprises: a plurality of navigation indicators to indicate the navigation information, and a compass comprising a plurality of rotational orientation indicators to indicate rotational orientation information.

In another aspect, an undersea navigation system for use with a diver undersea navigation device is provided. The system comprises a plurality of sensors configured to sense navigation information; a display; a processor coupled to the graphics processing unit, wherein the processor is configured to control the plurality of sensors; and a memory coupled to the processor, the memory storing instructions executable by the processor to: receive the navigation information from the plurality of sensors; convert the navigation information into graphics data; and provide the graphics data to a graphics processing unit to render a navigation board image on the display, wherein the navigation board image comprises: a compass comprising a plurality of heading direction indicators, a current heading indicator, and a plurality of pitch indicators, wherein the plurality of pitch indicators indicate pitch information; a plurality of bearing indicators configured to display an intended bearing and an actual bearing of the diver; and a plurality of navigation indicators configured to display navigation information.

FIGURES

Figure 8A:
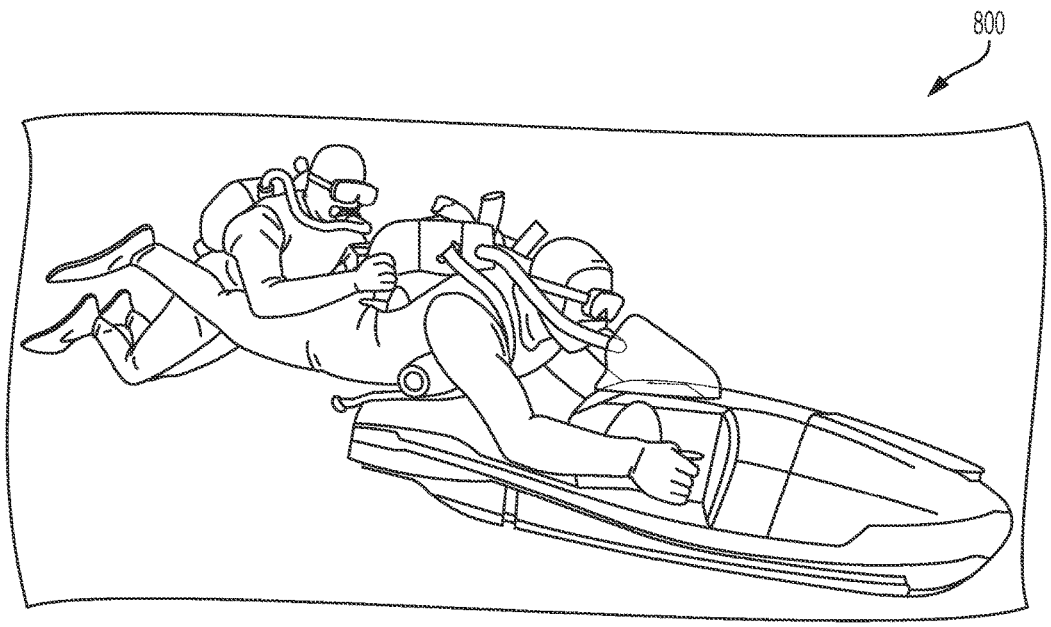
Figure 8B:
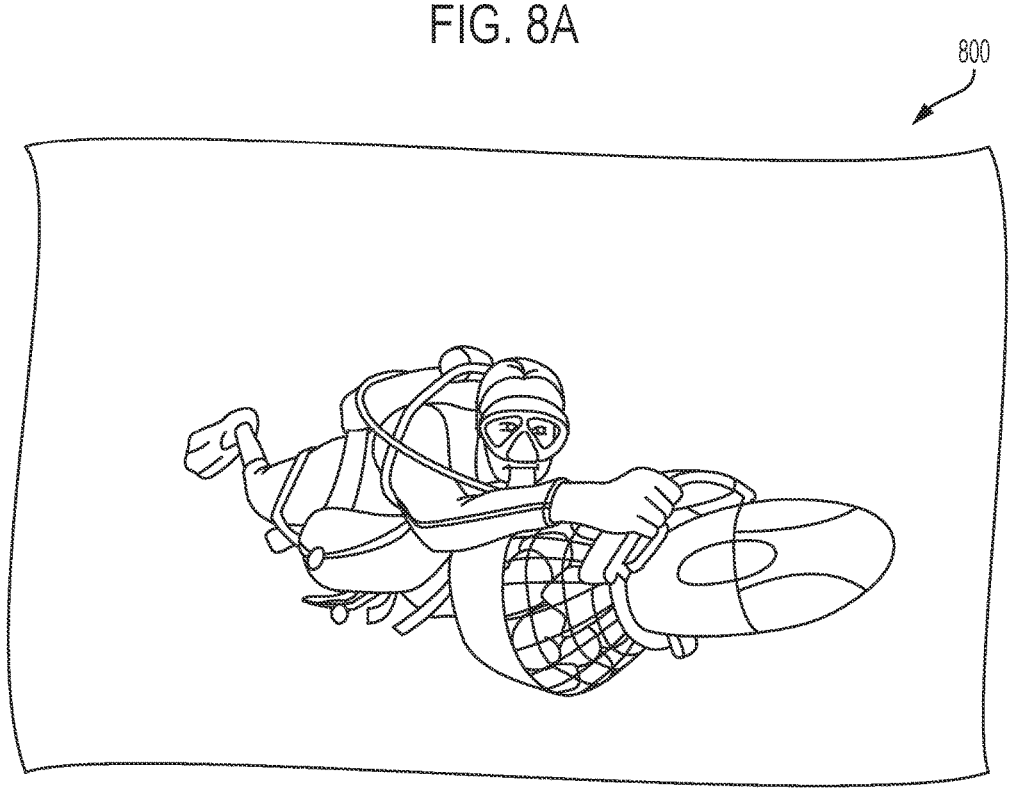

FIGS. 8A-B depict various diver propulsion devices according to aspects of this disclosure.

Figure 9:
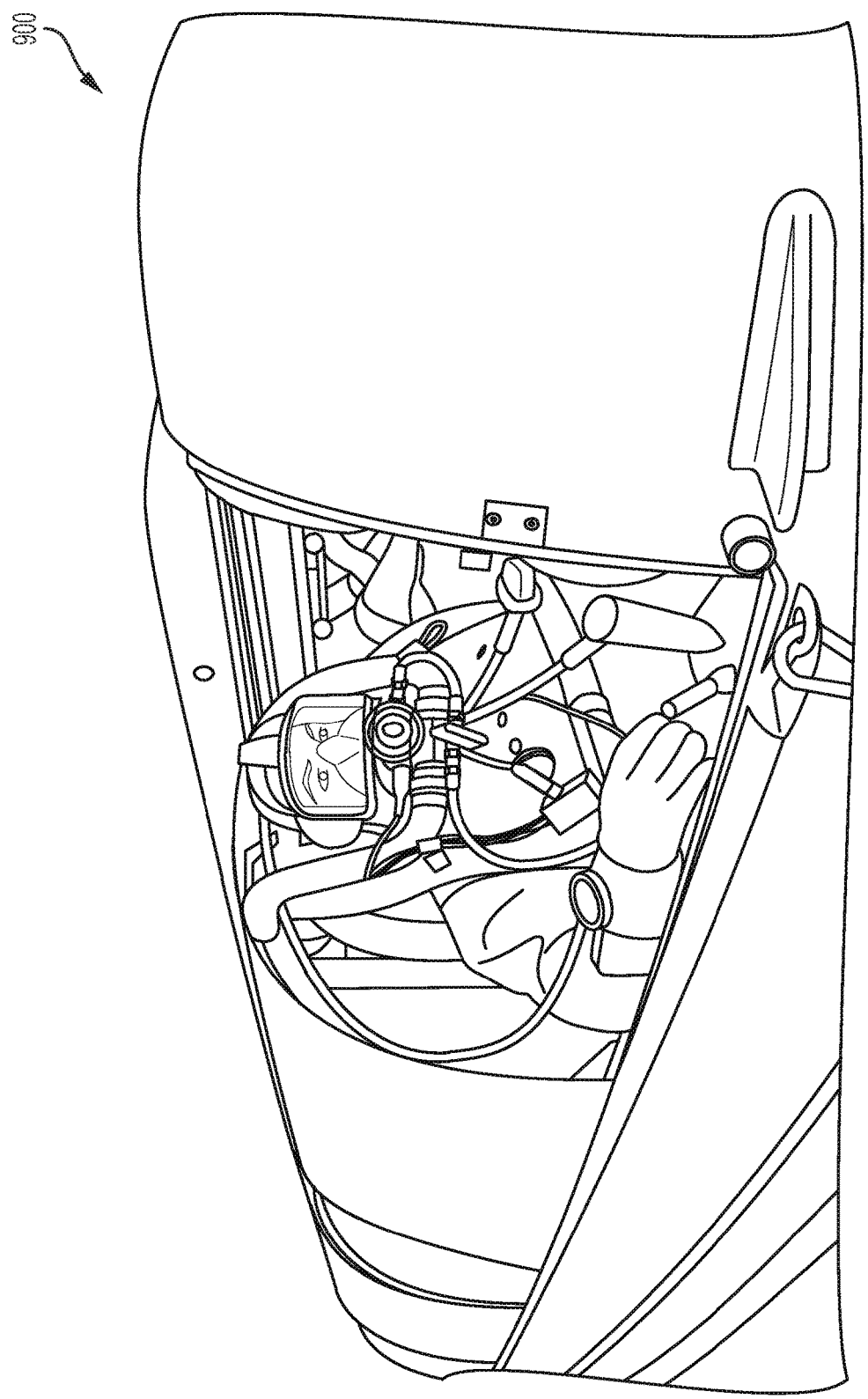

FIG. 9 is a graphical depiction of a wet submersible according to one aspect of this disclosure.

Figure 10:
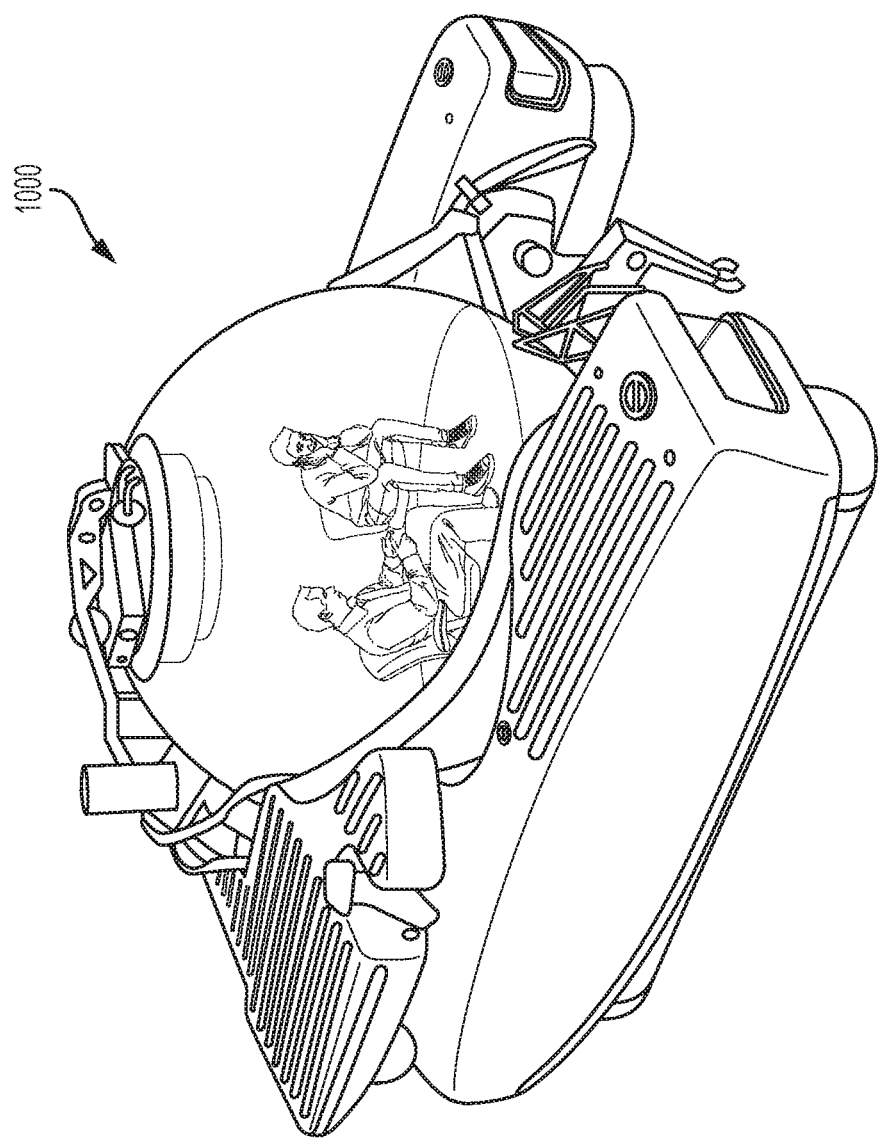

FIG. 10 is a graphical depiction of a dry submersible according to one aspect of this disclosure.

Figure 11:
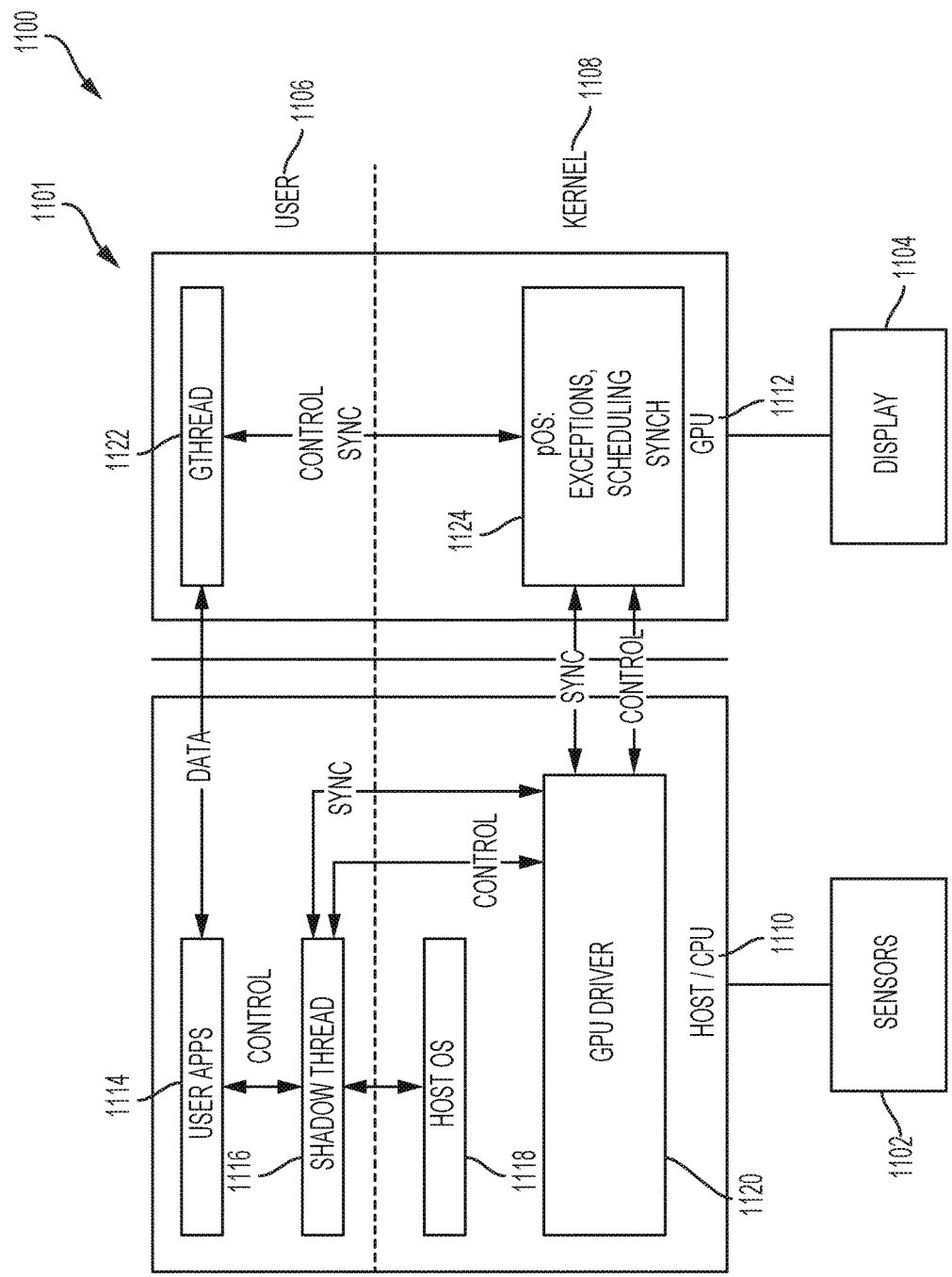

FIG. 11 is a schematic diagram of a computer based undersea navigation system including a central processing unit in communication with a graphics processing unit, a plurality of sensors, and a display according to one aspect of this disclosure.

Figure 12:
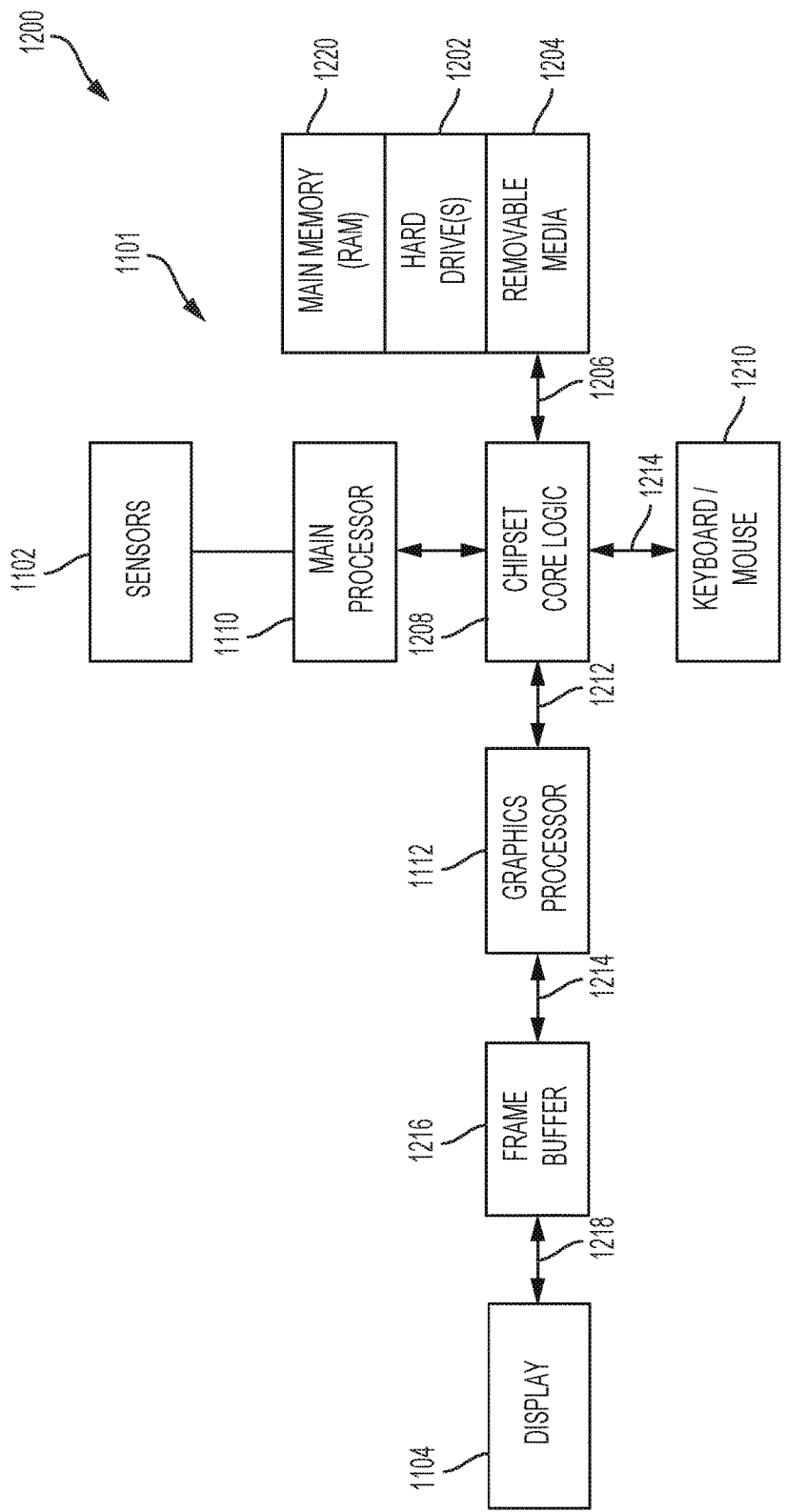

FIG. 12 is a system diagram of the computer based undersea navigation system according to one aspect of this disclosure.

Figure 13:
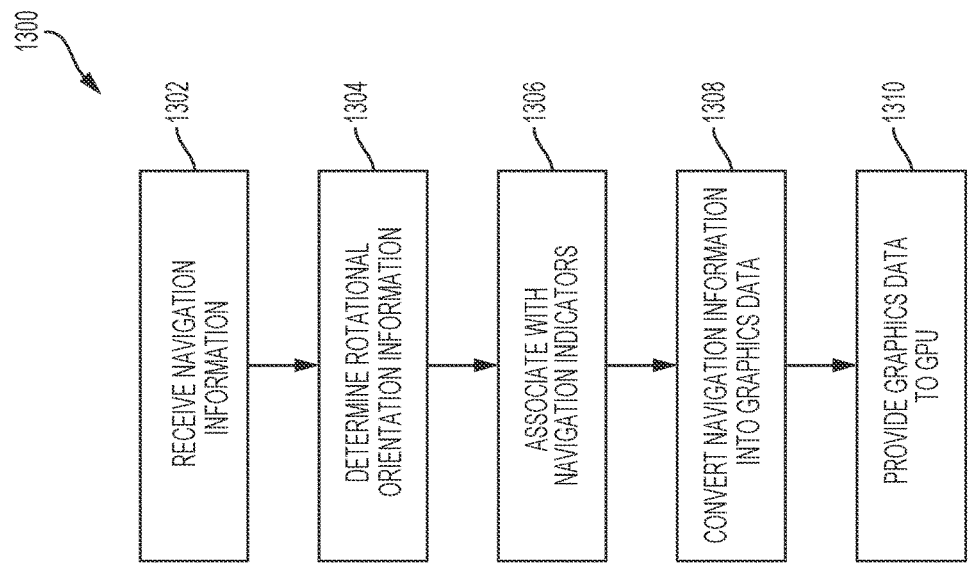

FIG. 13 is a logic diagram of a method for undersea navigation with a maritime vehicle or a diver undersea navigation device, according to one aspect of the present disclosure.

DESCRIPTION

In the following detailed description, reference is made to the accompanying drawings, which form a part hereof. In the drawings, similar symbols and reference characters typically identify similar components throughout the several views, unless context dictates otherwise. The illustrative aspects described in the detailed description, drawings, and claims are not meant to be limiting. Other aspects may be utilized, and other changes may be made, without departing from the scope of the subject matter presented here.

Before explaining the various aspects of the system and method for undersea navigation, it should be noted that the various aspects disclosed herein are not limited in their application or use to the details of construction and arrangement of parts illustrated in the accompanying drawings and description. Rather, the disclosed aspects may be positioned or incorporated in other aspects, variations and modifications thereof, and may be practiced or carried out in various ways. Accordingly, aspects of the system and method for undersea navigation disclosed herein are illustrative in nature and are not meant to limit the scope or application thereof. Furthermore, unless otherwise indicated, the terms and expressions employed herein have been chosen for the purpose of describing the aspects for the convenience of the reader and are not to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

In one aspect, the present disclosure provides an improved undersea navigation system for use with a maritime vehicle or diver undersea navigation device. Advantages of the improved undersea navigation system include improved situational awareness and emphasis of dangerous conditions for the user or diver. The improved undersea navigation system comprises rendering a navigation board image by a graphics processing unit on a display of a maritime vehicle or diver undersea navigation device. The navigation board image can include an integrated transparent compass and sonar or map display screen with rotational orientation indicators and navigation indicators. In this way, the rendered navigation board image is specifically structured to address identifying occurrences of dangerous undersea navigation and enhancing the speed, accuracy, and usability of undersea navigation systems.

For example, a user or diver could swim or move while inadvertently oriented pitch-up (e.g. the diver or maritime vehicle is slightly angled upwards such that they are ascending while moving). In this case, the user or diver could rapidly ascend upwards and unknowingly exceed a viability threshold. The viability threshold may indicate that the user or diver is ascending or descending too quickly and consequently incurs health risks, such as pulmonary over-inflation, barotrauma, or reverse block. Additionally, the user or diver could be moving at a significant speed while pitch-up such that the user or diver collides with another diver or some other object without noticing, for example. The specifically structured improved undersea navigation system identifies and highlights the existence of such dangerous conditions. In this connection, the rotational orientation indicators of the improved undersea navigation system, such as pitch indicators, may indicate the criticality of the current pitch of the maritime vehicle or diver. The pitch indicators may change color or a shade of color to highlight that the ascent or decent rate is changing too quickly. In this way, the user or diver is timely alerted that the pitch rate is changing too significantly and/or that continuing on the current trajectory of the diver or maritime vehicle will cause a collision with another diver or object.

Moreover, the improved undersea navigation system enhances the situational awareness of the user or diver. Using the integrated navigation board image, the user or diver can timely and spatially relate their location with respect to the water column and their current orientation (as indicated by the transparent compass and rotational orientation indicators). Also, the user or diver can more accurately define and understand the relationship between their current orientation and objects in the vicinity, as illustrated by the combined transparent compass and sonar or map screen. The user or diver can relate their current bearings as indicated by the transparent compass with their current location in the water column and/or an observed object using the sonar and/or map. For example, the user or diver could receive information that there is a pier system located 14 degrees away and subsequently readily locate the pier system using the combined transparent compass and sonar or map screen. Using the improved undersea navigation system, the user or diver may accurately and quickly perceive identified objects relative to their current bearings as well as efficiently locate objects based on received positional information relative to current bearings.

Conventional undersea navigation systems may not address such dangerous conditions or deficiencies in navigating as described above. The design of conventional undersea navigation systems can be tailored towards users or divers that specifically move through the water column in a predefined pattern. For example, the design of such systems may assume that users or divers move methodically in an interlaced (i.e. alternating) ascending and descending pattern through the water column. In such methodical configurations, the pitch may be predefined such that divers or users move alternately between a predefined descent rate and a predefined ascent rate. In this connection, users or divers who do not move in such a specific methodical pattern may not be aware of dangerous conditions and may lack enhanced situational awareness, as described above. For example, users or divers may move directly from one point to another, without alternatively moving up and down the water column.

Figure 1:
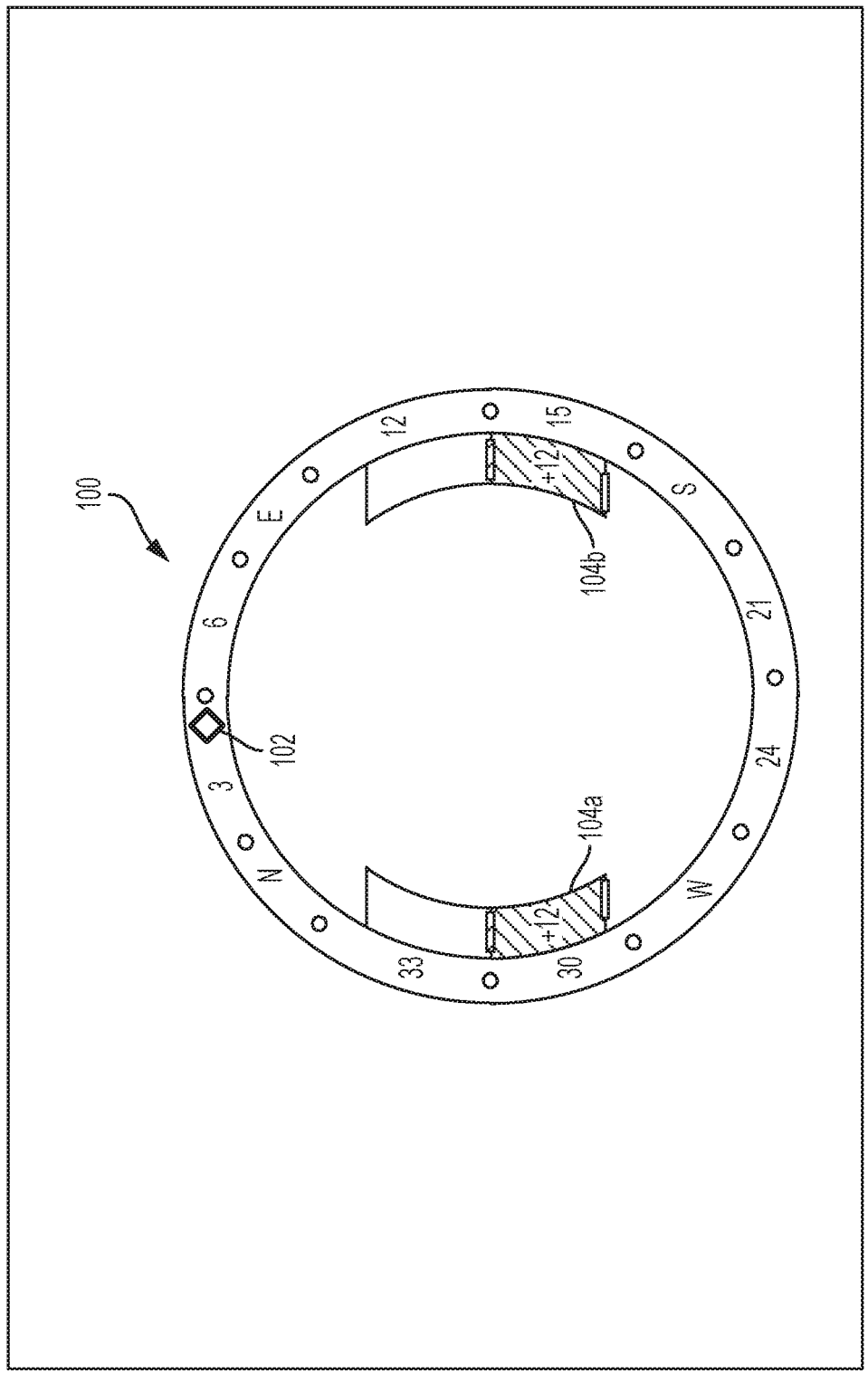
FIG. 1 is a graphical depiction of a transparent compass according to one aspect of this disclosure.

FIG. 1 is a graphical depiction of a transparent compass 100 that includes a number of rotational orientation indicators. The transparent compass 100 is depicted in FIG. 1 as having a blue annular shape, such as a circle. The transparent compass 100 includes compass rows which are indicia for directional orientation on a yaw (i.e. longitudinal) axis. The compass rows range from 0 to 360 degrees and are spaced in increments of 30 degrees. As shown in FIG. 1, the compass rows range may be denoted with one reduced order of magnitude. That is, the degree indicia range can be divided by 10 such that the compass row degree indicia range from 0 to 36 instead of 0 to 360. Thus, a user or diver can look at the transparent compass 100 to quantitatively determine their current bearings. In one aspect, a central processing unit (CPU) 1110 is coupled to a graphics processing unit (GPU) 1112 to provide the compass information to the GPU 1112 for rendering the transparent compass 100 on the display 1104 for undersea navigation. The display 1104 can be any suitable commercially available display, such as a liquid crystal display (LCD) mounted in a waterproof enclosure constructed of plexiglass, for example. The CPU 1110, GPU 1112, and display 1104 are described in further detail in connection with FIGS. 11-12.

The degree indicia corresponding to cardinal directions may be replaced on the transparent compass 100 by a letter for the respective cardinal direction. In this connection, degree indicia 0 and 360 are replaced with N for the north direction, 9 is replaced with E for the east direction, 18 is replaced with S for the south direction, and 27 is replaced with W for the west direction. A diamond indicator 102 is used to indicate current bearings, such as the instantaneous orientation with respect to the yaw axis (i.e. heading). Moreover, intermediate indicia can appear as white indicator dots, for example. Such intermediate indicia may indicate degrees between succeeding instances of the degree indicia range, such as 1.5 to 31.5, in increments of 3. The intermediate indicia are also described in terms of the reduced order of magnitude of the compass rows, so 1.5 indicates 15 degrees and 31.5 indicates 315 degrees, for example. The rotational orientation indicators depicted on the transparent compass 100 appearing on the display 1104 include pitch indicators 104a, 104b, as shown in FIG. 1.

The pitch indicators 104a, 104b indicate pitch information such as ascent or descent orientation. In FIG. 1, the pitch indicators 104a, 104b show +12 to indicate that the current pitch orientation of the user or diver is positive twelve degrees in the ascending direction relative to the perpendicular yaw axis. Conversely, negative numbers of the pitch indicators 104a, 104b indicate that the user or diver is angled in a descending direction relative to the yaw axis. In another aspect, the pitch indicators 104a, 104b could be inverted such that positive indicates descending (diving) while negative indicates ascending (surfacing). Using the pitch indicators 104a, 104b in conjunction with the transparent compass 100, the user or diver may timely relate their current bearing with current pitch. In other words, the user or diver may readily understand the spatial relationship between their current heading and how they are ascending or descending. In this connection, the transparent compass 100 is see through so that the pitch indicators 104a, 104b appear visible within the interior of the compass circumference, as illustrated in FIG. 1.

In addition to enhanced situational awareness of the diver or user, the pitch indicators 104a, 104b can also indicate criticality. The pitch indicators 104a, 104b may reflect or change to a color such as red, for example, to indicate that the user or diver is approaching an unviable threshold. The unviable threshold can refer to a threshold that when exceeded corresponds to adverse health effects or risks. The pitch indicators 104a, 104b may also change a shade of color such as a darker red to indicate that user or diver is rapidly approaching or close to the unviable threshold. The shade of color can also change at roughly the same rate as the user or diver is approaching the unviable threshold such that the change in color is consistent or reflective of the rate at which the user or diver approaches the dangerous unviable threshold. As used in the present disclosure, the shade of color can refer to shades, tints, tones or other hues of a color.

Figure 2:
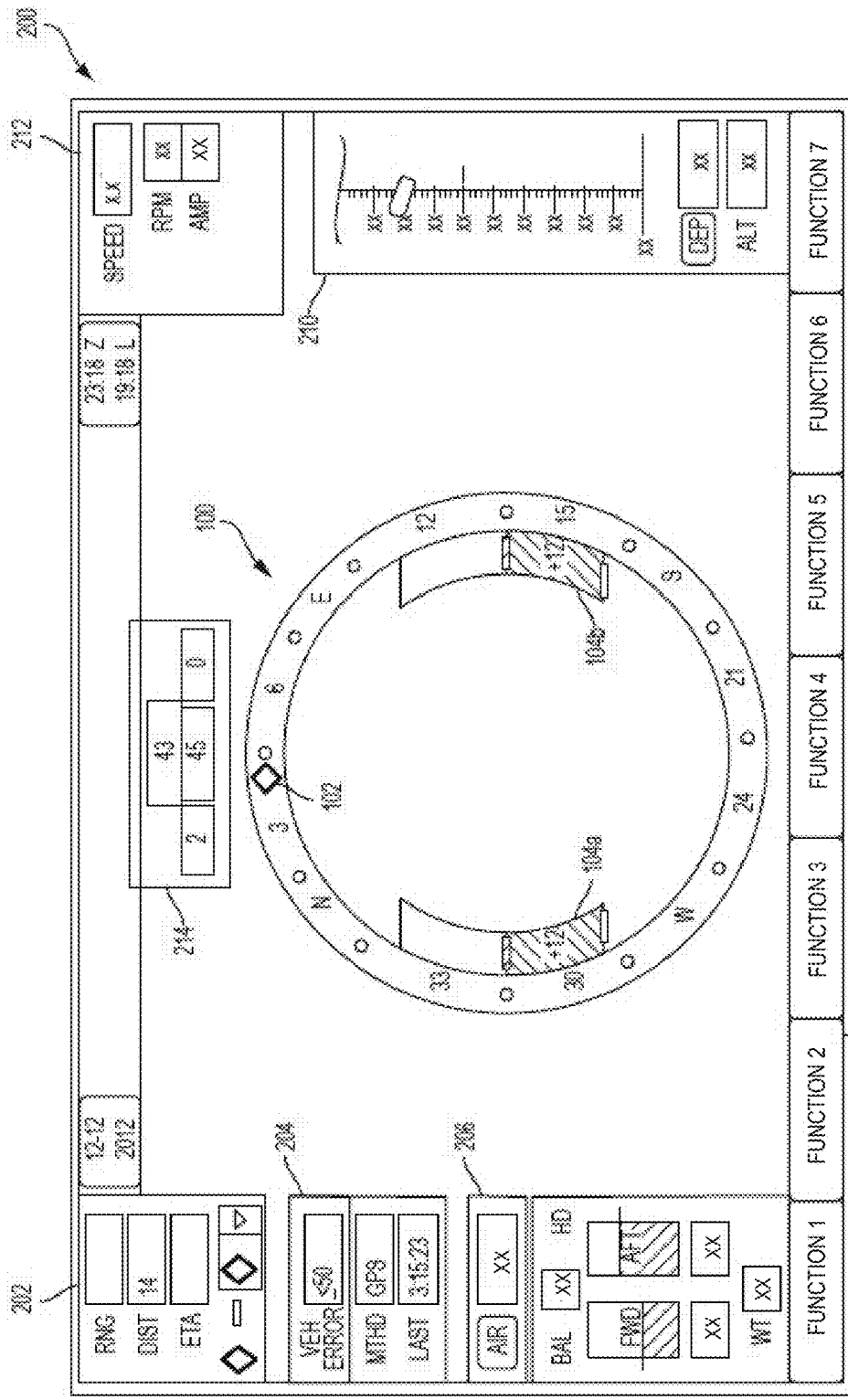
FIG. 2 is a graphical depiction of a navigation board image including a transparent compass, rotational orientation indicators, and navigation indicators according to one aspect of this disclosure.

FIG. 2 is a graphical depiction of a navigation board image 200 including a transparent compass 100, rotational orientation indicators, and navigation indicators according to one aspect of this disclosure. In one aspect, the navigation board image 200 is rendered by the GPU 1112 on the display 1104 as a graphical user interface (GUI). The one or more memory devices coupled to the CPU 1110 store computer executable instructions that when executed cause the CPU 1110 to receive navigation information from a sensor interface. In turn, the sensor interface is communicatively coupled to a plurality of sensors 1102 to receive navigation information sensed by the sensors 1102. As discussed below in connection with FIGS. 11-12, the sensors 1102 may comprise sonar sensors, temperature sensors, pressure sensors, conductivity sensors, gyroscopes, sonar sensors, doppler sensors, any other suitable sensor, or a combination thereof. Information sensed by the sensors 1102 can be displayed on the navigation board image 200 using the navigation indicators described below. The CPU 1110 converts the navigation information into graphics data and provides the graphics data to the GPU for rendering the navigation board image 200.

As shown in FIG. 2, navigation information is displayed on the display 1104 by a plurality of navigation indicators 202, 204, 206, 210, 212. Such navigation indicators can be used in submersibles, for example. The display 1104 can be implemented on a maritime vehicle such as remotely operated vehicles and submersibles as well as diver undersea navigation devices such as diver propulsion devices and navigation boards. In such maritime vehicle and undersea navigation environments, space for the display 1104 may be limited. In some contexts, there may only be space for one display screen. The navigation board images described in the present disclosure may address the spatial limitations of undersea navigation environments in providing enhanced situational awareness and identification of dangerous conditions.

The trajectory parameter indicators 202 include graphical components to indicate range, distance and estimated time of arrival relative to a trajectory of a maritime vehicle or diver. The trajectory verification indicators 204 include graphical components to indicate calculation of vehicle error, a last update method, and the time in which the last update method was performed. The last update could be performed with the global positioning system (GPS), for example. The air gauge indicator 206 indicates the level of breathable air a user or diver has available. That is, how much air remains until the source of air (e.g. tanks of air) becomes empty (i.e. exhausted). The ballast status indicator 207 indicates how many tanks are in the maritime vehicle for adjusting draft and improving stability. The ballast status indicator 207 also provides such ballast information with respect to the forward, back (aft), and weight of the maritime vehicle. The screen tab indicators 208 are user selectable GUI components that enable the user to view the maritime vehicle log, select LOS navigation, turn the compass off, view the next leg of the current itinerary, update information, show updated information, and activate pilot view.

The water column depth gauge indicator 210 indicates the current depth of the maritime vehicle or diver, which is calculated based on pressure exerted by the water column minus atmospheric pressure. The depth and altitude are also graphically indicated on the navigation board image 200, as can be seen in FIG. 2. The water column depth gauge indicator 210 is a two dimensional graphical depiction of the current location in the water column. The speed indicator 212 indicates speed, rotations per minute, and ampere parameter of the maritime vehicle. The heading indicators 214 comprise the four interconnected boxes depicted in FIG. 2, which can be navigational aids. The top box numerically displays the current heading as 43 degrees, which is confirmed by the diamond indicator 102. The bottom box numerically displays the intended bearing as 45 degrees according to a navigation plan such as a predetermined trajectory or itinerary. The left and right boxes numerically display cross track from the intended bearing in the left and right directions as 2 and 0, respectively. Cross track refers to the deviation from the intended navigation path, which is 2 yards to the left direction in the situation shown in FIG. 2.

As described above, the navigation board image 200 is specifically designed to emphasize the criticality associated with how the diver or user is moving. In particular, the criticality can refer to health risks to the diver or user or injuries to objects or people in the vicinity of the diver or user. Health risks result from ascending too quickly, such as decompression sickness (i.e. the bends). When a diver ascends too quickly, the resulting pressure drop causes nitrogen in the blood or tissues of the diver to form gas bubbles that block or impede circulation. Decompression sickness resulting from such a quick ascent can cause crippling joint pain, back pain, severe and sudden headache, tingling and numbness, dizziness, chest pain, disorientation, shock, paralysis, stroke, and even death. Barotraumas/overinflation (e.g. pulmonary or ear) or reverse blocks can happen when the air pockets in ears or lungs experience an excessive increase in pressure such that expanding air is trapped, causing the air pockets to become too full of air. Similarly, health risks also result from descending too quickly, such as narcosis, excessive absorption of nitrogen, and pain from the decrease in water pressure. In both the cases of ascending and descending too quickly, the pressure may change too rapidly for the diver to equalize in response to the pressure change.

The problem of excessive ascent and descent rates is particularly acute for divers using diver propulsion devices or users using submersibles because such divers and user may move substantially faster than divers swimming without such devices. Significantly, users or divers that move at such substantial speeds only need to be distracted from paying attention to pitch for a short period of time before they may surpass the unviable threshold. Accordingly, timely indication of pitch may be important for avoiding injury and other dangerous conditions. To address these dangers, the pitch indicators 104a, 104b highlight dangerous conditions by changing color or a shade of color to indicate that the current pitch will result in approaching and/or exceeding the unviable threshold. In this way, a diver who does not realize that they are slightly pitch-down could descend too quickly and risk perforating their eardrums. As discussed above, the risk resulting from unawareness of critical pitch or movement information may be amplified when the user is driving a submersible that can move ten times the typical speed of the diver, for example. Moreover, the user or diver that is insufficiently aware of how they are moving may accidentally collide with another diver or inanimate object.

To address this danger, the pitch indicators 104a, 104b may change to a deep shade of red for timely alerting the user or diver before such a collision occurs. The progressively changing shade of color may indicate to the user of the maritime vehicle that their speed of ascent or descent is so fast that there is a significant risk of potentially injuring other divers on the maritime vehicle. Similarly, the change in color or shade of the color may indicate that the diver is swimming too deep based on the depth rating of the scuba rig used by the diver, for example. The depth rating of a scuba rig refers to the maximum depth a diver can attain while using the scuba rig. This depth rating could correspond to the unviable threshold. In any case, the pitch indicators 104a, 104b may timely indicate/identify and emphasize dangerous conditions (or risk of such conditions) to the diver so the diver can take corrective action. The unviable threshold can depend on the undersea navigation equipment used as well as the movement habits of the user or diver. In one aspect, the unviable threshold may be ascending at 30 feet per minute, which corresponds to one possible diving standard.

Exceeding the 30 feet per minute threshold may result in excessive residual gases (e.g. nitrogen and oxygen) expanding as pressure decreases (i.e. when the diver is ascending) and causes harmful expansion in the body of the diver, such as in joints or in the lungs. In the worst case scenario, the lungs may puncture due to the expanding residual gases. The diving standard for descending may be 120 feet per minute. Exceeding this standard can result in the diver breathing a poisonous level of oxygen. For example, due to the change in pressure from such a quick descent, the diver that uses a pure oxygen scuba rig may experience an increase in the partial pressure of oxygen from 100% at the surface to 200% at 20 feet, for example. The diver who is unaware of being slightly pitch up or pitch down can quickly transition into a dangerous situation without the pitch indicators 104a, 104b timely emphasizing that their current pitch is dangerous. As discussed above, such danger could be due to health risks or a risk of injury to others in the vicinity. Additionally or alternatively to the unviable rate, the unviable threshold could be a specific depth level.

Figure 3:
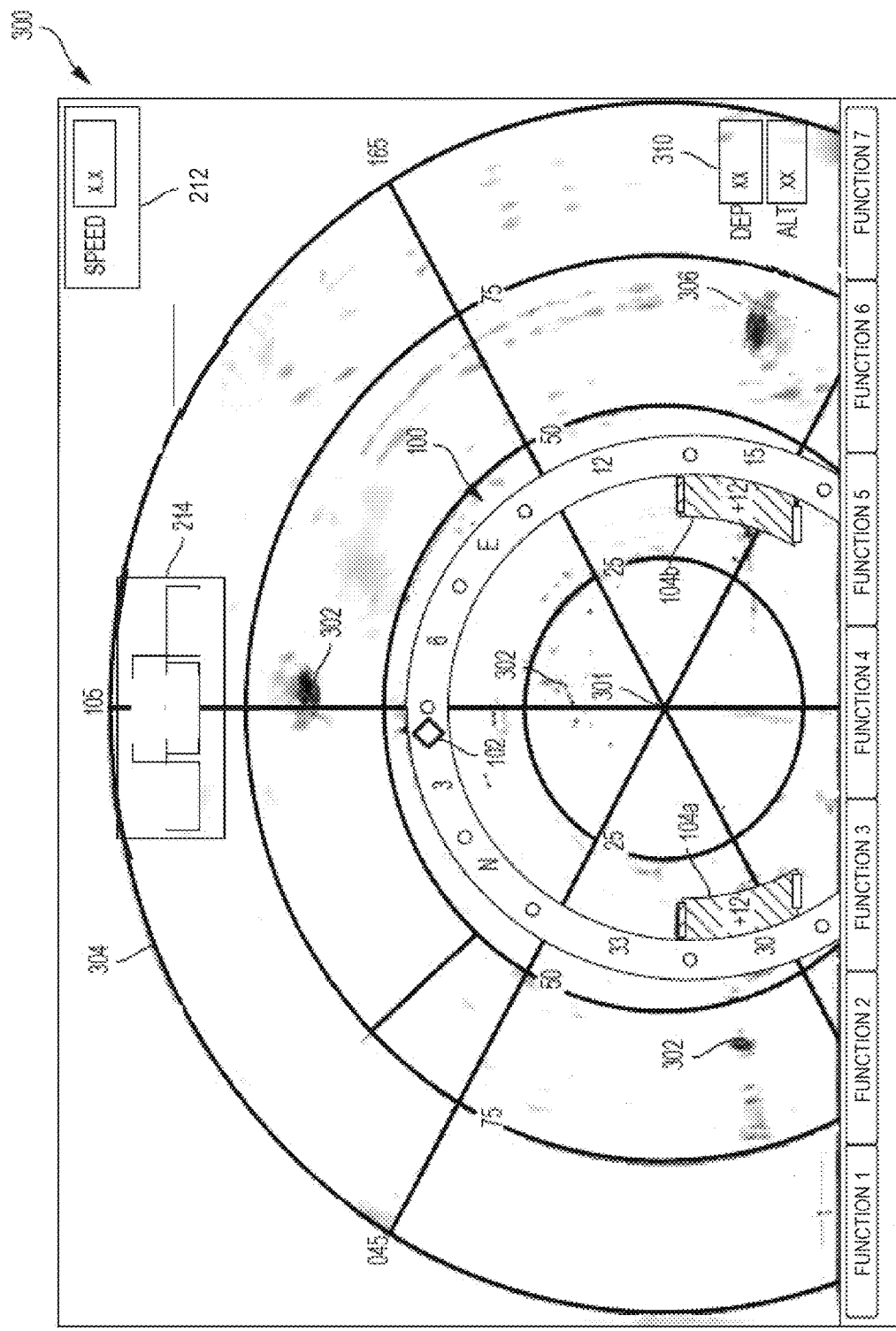
FIG. 3 is a graphical depiction of another navigation board image including a transparent compass superimposed onto a sonar display screen, rotational orientation indicators, and navigation indicators according to one aspect of this disclosure.

FIG. 3 is a graphical depiction of another navigation board image 300 including a transparent compass superimposed onto a sonar display screen, rotational orientation indicators, and navigation indicators according to one aspect of this disclosure. As discussed in the present disclosure, superimposing the transparent compass 100 onto a sonar screen component 304 navigation indicator for the navigation board image 300 rendered by the GPU 1112 advantageously enables enhanced situational awareness for the user or diver. Additionally or alternatively to the sonar screen component 304 navigation indicator, the navigation board image 300 can comprise a map screen component navigation indicator. For example, the map screen component may be a digital nautical chart (DNC) or Doppler based screen. The sonar screen component 304 may be generated based on sonar data sensed by the sonar sensor 1102. In one aspect, the sonar sensor 1102 is configured to transmit acoustic signals by converting pulses of electrical energy into sound energy (i.e. sound waves) using a transducer. As the sound waves propagate through the water, the sound waves define a cone shaped pattern comprising progressive wider waves. When the sound waves hit an object, the resulting returning echoes are detected by an antenna. The echoes are converted back into electrical energy and amplified to determine the distance of the object from the originating location.

The transducer concentrates the sound into a beam. A sonar beam includes a frequency and a beam angle characteristic. The frequency characteristic is defined as the number of sound pulses per second, which can be measured in kilohertz for example. Lower frequencies propagate a greater distance than higher frequencies. The sonar sensor 1102 can operate in an active mode in which such sound energy pulses (i.e pings) are transmitted by the transducer and also in a passive mode in which the antenna merely listens (i.e. detects) sounds from objects in the surrounding area. The command feature GUI icon CMD in FIG. 3 can be used to switch on the passive mode as denoted by the passive broad band (PBB) GUI icon and to select other sonar options. In FIG. 3, the sonar data displayed on the sonar screen component 304 corresponds to a beam angle of 60 degrees. Accordingly, the sonar screen component 304 appears as concentric circles in which the largest circle is denoted in 60 degree increments. The degree parameters range from 45 to 105 to 165 to 225 to 285 to 345 (last three parameters not pictured). The concentric circles also reflect the distance traveled by the sonar. In this way, the smallest inner circle is labeled 25, the first middle circle labeled 50 and the second middle circle labeled 75. The largest circle forms a boundary for the sonar screen component 304.

The location of the maritime vehicle or diver (for diver undersea navigation devices that have sonar) may be indicated by the center point 301, which is located at the intersection of the three lines corresponding to degree parameters 45, 105, and 165. From the center point 301, the user or diver may readily relate objects in the vicinity as indicated on the sonar screen component 304 with their current bearing as indicated by the transparent compass 100 and their orientation/location in the water column as indicated by the pitch indicators 104a, 104b, or any combination or subcombination of the above. For example, using the integrated transparent compass 100 and sonar screen component 304, the user or diver can perceive an object 302 in front of the navigation device or maritime vehicle. Such an object 302 can readily be spatially related to the current bearings as indicated by the compass rows and diamond indicator 102. In one example, a person inside the maritime vehicle can inform the maritime vehicle pilot of an identified object 302 and clearly identify the position of that identified object 302 relative to the maritime vehicle. This clear identification could make obstacle avoidance by the maritime vehicle easier. The relative position may be described with significant accuracy with respect to degrees based on perceiving the transparent compass 100 and sonar screen component 304 in conjunction.

The enhanced situational awareness resulting from the navigation board image 300 may be particularly advantageous with respect to remotely operated vehicles (ROVs). A person controlling the ROV remotely (e.g. from the surface rather than in the ocean) may realize more space on their ROV display 1104 using the navigation board image 300. Objects 302 detected by sonar may appear on the sonar screen component 304 as variously shaped objects and in varying colors. Based on the shape and color, objects 302 can be identified as marine life, swimmers, submerged vehicles, quay walls, and other types of objects. As can be seen in FIG. 3, large objects 306 can be identified as obstacles and possibly avoided based on the enhanced situational awareness. The navigation board image 300 also comprises screen tab indicators 308, which are user selectable GUI components. The water column depth gauge 310 graphically indicates depth and altitude while the speed indicator 212 indicates speed.

The transparent nature of the transparent compass 100 in the navigation board image 300 may enable the user or diver to view and perceive information displayed in the interior circumference of the transparent compass 100. In this connection, the user or diver may orient the transparent compass 100 according to where the user or diver is located on the map as well as located in relation to the sonar. Based on this enhanced situational awareness, the user or diver may timely and better understand the spatial relationship between their current location at the center point 301 to objects 302 and obstacles 306 as well as to their location in the water column and current bearings.

Figure 4:
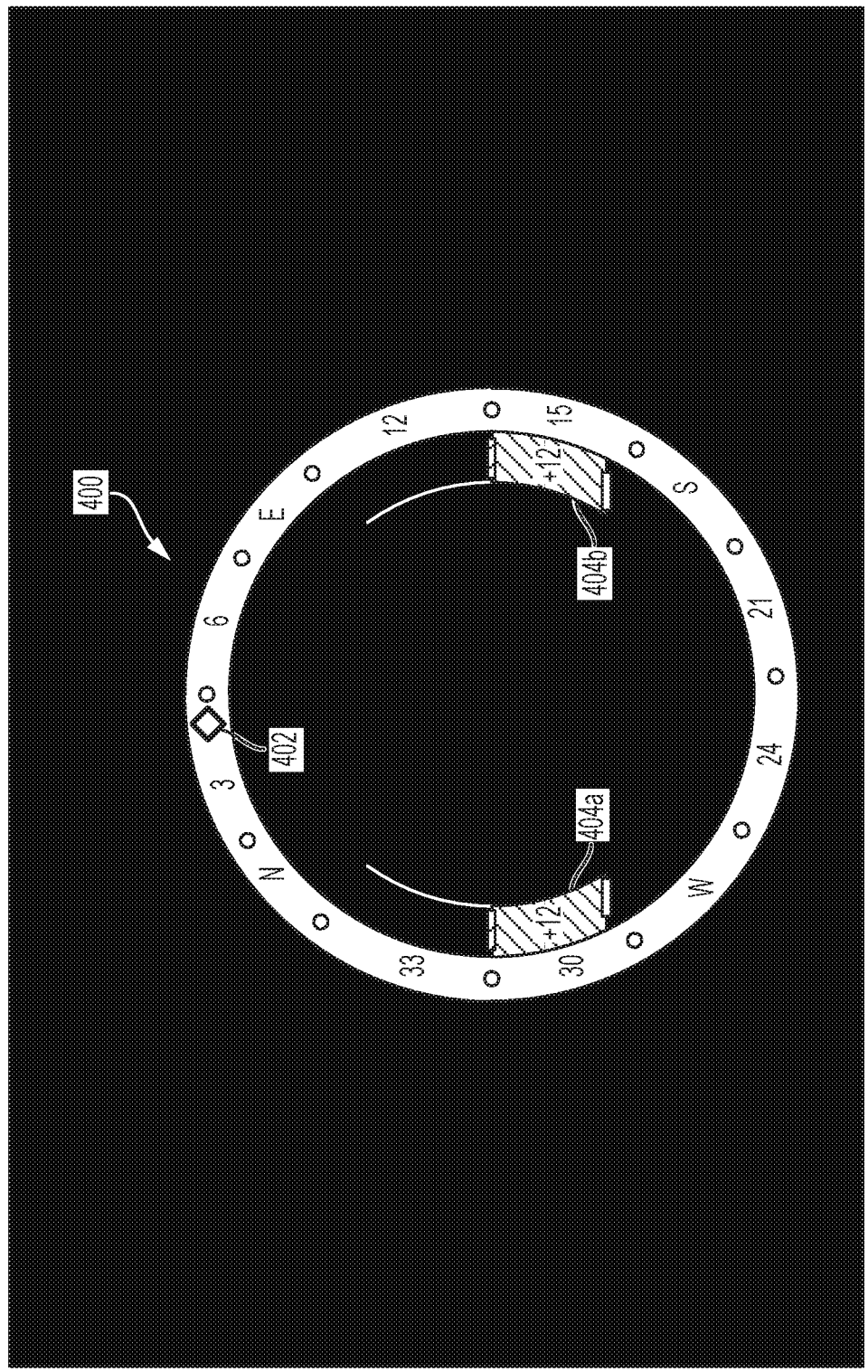
FIG. 4 is a graphical depiction of another transparent compass according to one aspect of this disclosure.

FIG. 4 is a graphical depiction of another transparent compass 400 according to one aspect of this disclosure. The diamond indicator 402 and pitch indicators 404a, 404b can be easily visible in the black background of FIG. 4. The compass rows, cardinal directions, and secondary indicia appear on the transparent compass 400 as described with reference to the transparent compass 100. The black background of FIG. 4 may be particularly conducive to underwater diving. A brighter background could cause some inhibition to the visibility of transparent compass 400 for the user or diver. For example, if the user or diver is located in murky, darker conditions, a sudden contrast between the darker conditions and a brighter background could cause eye readjustment problems (e.g. the user or diver may be squinting or straining to see the display 1104). Additionally or alternatively, the brighter background may cause the user or diver to look away from the display 1104.

Figure 5:
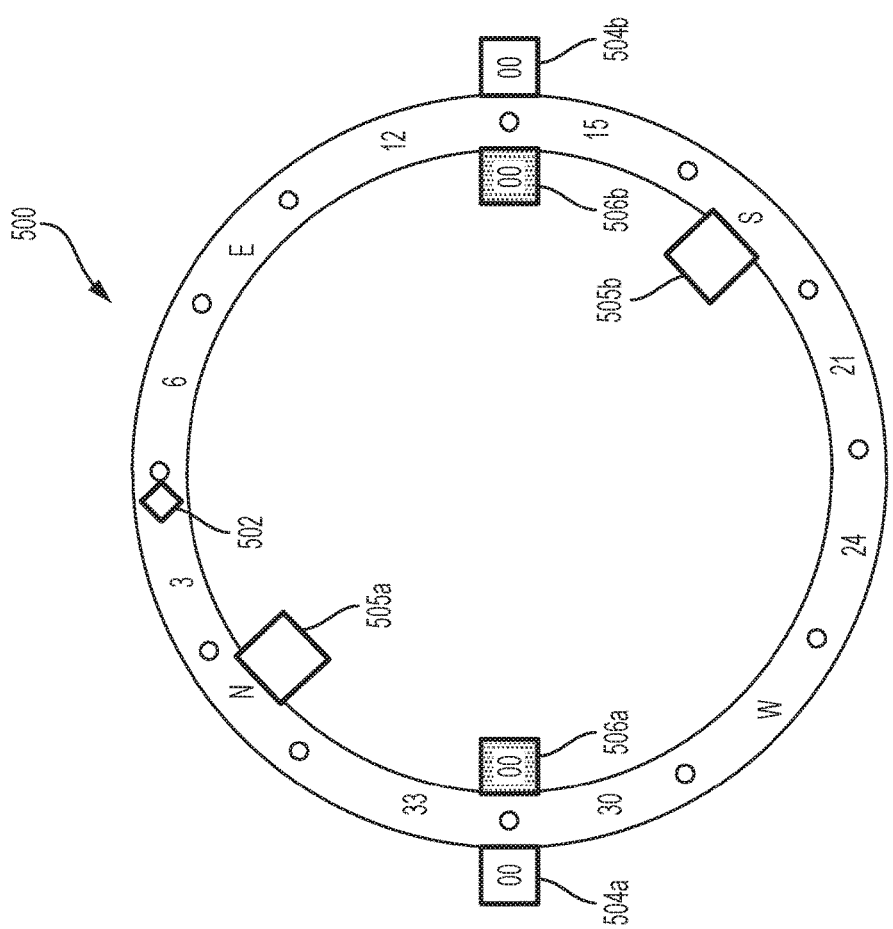
FIG. 5 is a graphical depiction of yet another transparent compass according to one aspect of this disclosure.

FIG. 5 is a graphical depiction of yet another transparent compass 500 according to one aspect of this disclosure. As can be seen in FIG. 5, the transparent compass 500 comprises diamond indicator 502, pitch indicators 504a, 504b, roll representors 505a, 505b, and roll indicators 506a, 506b. Like diamond indicator 102, diamond indicator 502 indicates the instantaneous orientation with respect to the yaw axis. In one aspect, the pitch indicators 504a, 504b are compact square boxes displaying numerical digitals to indicate the current pitch of the maritime vehicle or diver. In comparison to pitch indicators 504a, 504b, pitch indicators 404a, 404b may be more elongated. The pitch indicators 504a, 504b can also be configured to change a color or a shade of the color to indicate the criticality of the current pitch, as discussed above. Like the pitch indicators 504a, 504b, the roll indicators 506a, 506b are also compact square boxes which display numerical digits that indicate the current roll of the maritime vehicle or diver. The current roll is the instantaneous orientation of the maritime vehicle or diver with respect to the roll axis (i.e. longitudinal axis). The roll indicators 506a, 506b may be configured to change a color or a shade of the color to indicate criticality, and the color could be different from the color of the pitch indicators 504a, 504b to better distinguish the indicators. The shade of color can be a deeper shade as the risk of the dangerous condition becomes progressively higher.

Similar to the pitch indicators 504a, 504b, the roll indicators 506a, 506b may also be useful for enhanced situational awareness and identification of dangerous conditions. For example, knowing the current roll can enable the user or diver to take corrective action for avoiding any obstacles and better understanding their current rotational orientation. In particular, the user or diver who is unaware of their instantaneous roll orientation (e.g. by accidentally orienting themselves with respect to the longitudinal axis) may be timely alerted to their current bearings. Additionally, as shown in FIG. 5, the roll representors 505a, 505b visually represent the instantaneous roll orientation by moving along the interior of the transparent compass 500. Thus, the see through nature of the transparent compass 500 may beneficially allow the user or diver to spatially relate current roll with respect to current heading, location in the water column, location on the map/sonar, relative location of observed obstacles, and any subcombination or combination of the preceding. Like transparent compass 100, transparent compass 500 also comprises cardinal direction indicia ranging from N to W, degree indicia ranging from 0 to 36 (36 and 0 are replaced by cardinal direction N), and intermediate indicia.

Figure 6:
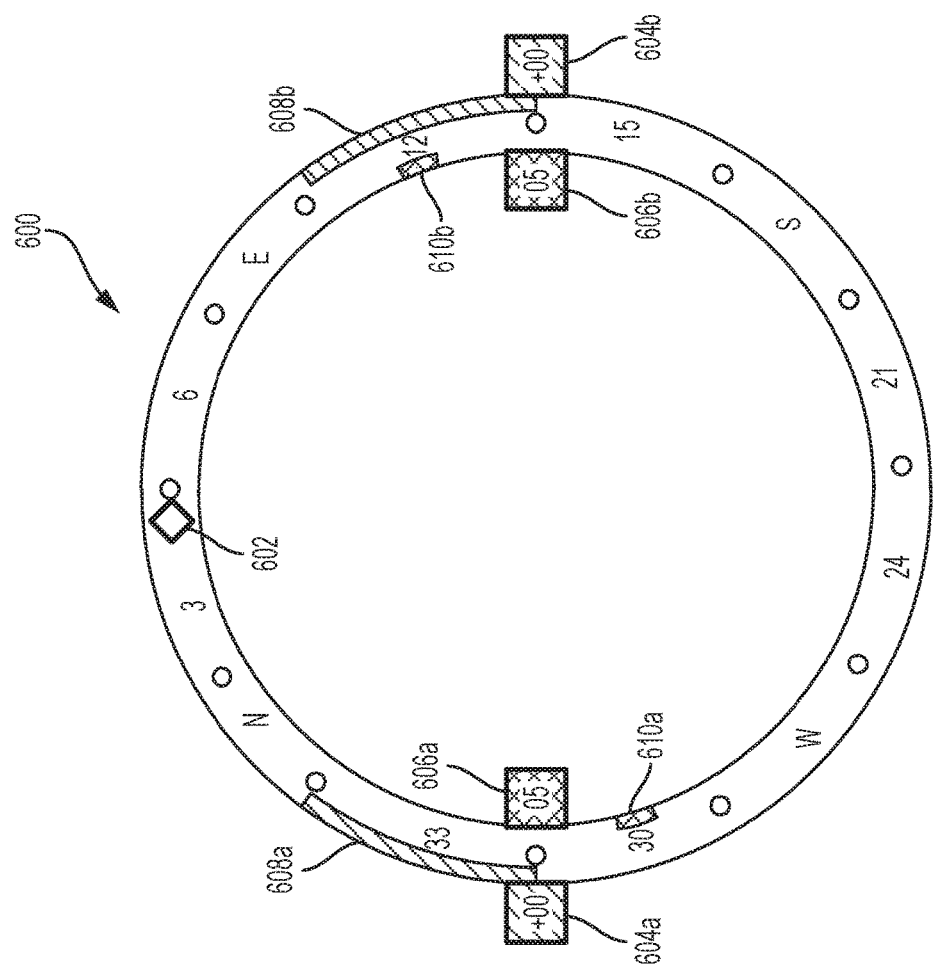
FIG. 6 is a graphical depiction of yet another transparent compass according to one aspect of this disclosure.

FIG. 6 is a graphical depiction of yet another transparent compass 600 according to one aspect of this disclosure. As can be seen in FIG. 6, the transparent compass 600 comprises diamond indicator 602, pitch indicators 604a, 604b, roll indicators 606a, 606b, associated pitch fills 608a, 608b, and associated roll fills 610a, 610b. Like diamond indicators 102, 502, diamond indicator 602 indicates the instantaneous orientation with respect to the yaw axis. As shown in FIG. 6, pitch indicators 604a, 604b are compact square boxes displaying numerical digitals to indicate the current pitch of the maritime vehicle or diver. Roll indicators 606a, 606b are also compact square boxes displaying numerical digitals to indicate the current roll of the maritime vehicle or diver. Both the pitch indicators 604a, 604b and roll indicators 606a, 606b may change a color or a shade of a color to indicate criticality, such as when a dangerous condition exists or there is a significant risk of a dangerous condition. The shade of color can be a deeper shade as the risk of the dangerous condition becomes progressively higher. The colors corresponding to the pitch indicators 604a, 604b and roll indicators 606a, 606b can be different to better illustrate the contrast between the two indicators.

In one example, the color of the pitch indicators 604a, 604b is red while the color of the roll indicators 606a, 606b is peach. The associated pitch fills 608a, 608b are associated with the pitch indicators 604a, 604b while the associated roll fills 610a, 610b are associated with the roll indicators 606a, 606b. For example, the extent of the corresponding fills of the associated pitch fills 608a, 608b and associated roll fills 610a, 610b can reflect safety or operational ranges depending on the current itinerary of the maritime vehicle or diver. The location of the red and peach fills with respect to the transparent compass 600 can reflect the current bearings of the maritime vehicle or user. As can be seen in FIG. 6, the location of the peach fills may reflect the current roll of 5 as indicated on the roll indicators 606a, 606b. The color of the fills may facilitate using the transparent compass 600 for enhanced situational awareness and timely emphasis of dangerous conditions. Any of the transparent compasses 100, 400, 500, 600 may be used with the sonar screen component 304 or other map screen component to form a suitable integrated navigation board image rendered by the GPU 1112 on the display 1104. The rotational orientation data displayed on the transparent compasses 100, 400, 500, 600 may be generated by a suitable magnetic compass, gyro compass, or other suitable compass. The CPU 1110 may receive this rotational orientation data from the compasses via, for example, a magnetic field sensor of the compasses.

Figure 7A:
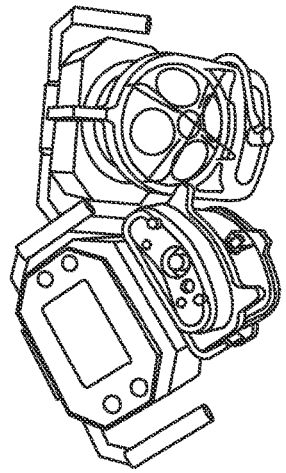
FIGS. 7A-7F depict various navigation boards according to aspects of this disclosure.

FIG. 7A-7F depict various navigation boards 700 according to one aspect of this disclosure. In one aspect, the navigation boards 700 are handheld electronic devices usable by scuba divers in conjunction with other scuba diving gear (e.g. swimming fins) while swimming through the water. The enclosure of the diver navigation boards 700 may be made of plastics such as suitable thermoplastic polymers that are insoluble in water. The navigation boards 700 may comprise the computer based undersea navigation system described in FIGS. 11-12 or a similar system. As can be seen in FIGS. 7A-7F, the diver navigation boards 700 comprise electric displays 1104 that are permanently coupled or embedded into the plastic enclosure. FIG. 7A, for example, depicts a RDI CobraTac navigation board (available from Teledyne RD Instruments of Poway, Calif.) with a LCD display 1104 coupled to a navigation computer (e.g. CPU 1110) of the CobraTac. In one aspect, the onboard navigation computer is coupled to the plurality of sensors 1102, which may include a doppler velocity log (DVL) for determining water velocity, a pressure sensor for detecting pressure of gases and fluids, and a fluxgate compass for generating compass rotational orientation data. These sensors 1102 may be used to acquire position and bathymetry data, which can be stored in one or more memory devices coupled to the CPU 1110, which in turn is coupled to the GPU 1112.

Figure 7B:
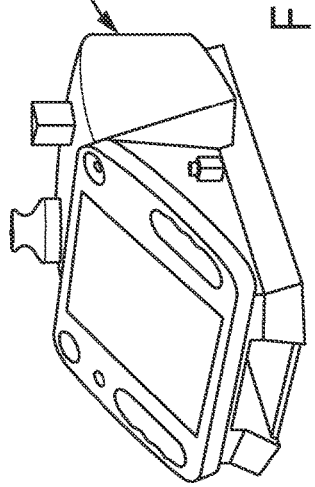
Figure 7C:
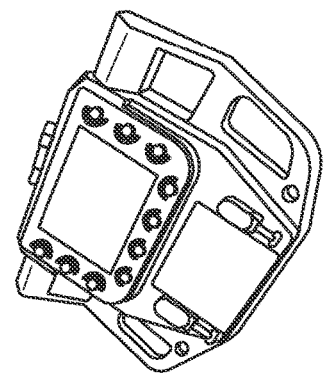
Figure 7D:
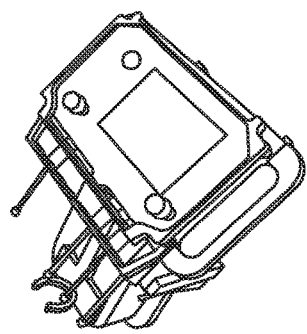
Figure 7E:
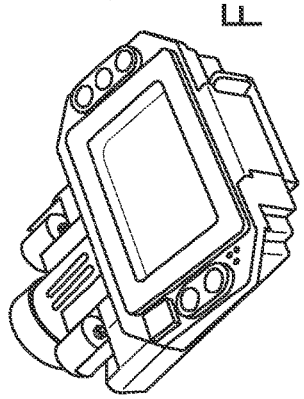
Figure 7F:
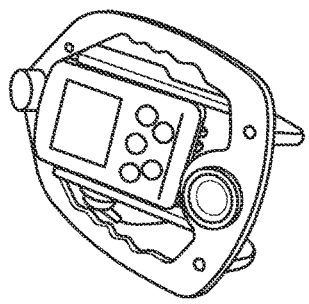

The diver navigation boards 700 may have handles for the diver to grasp the navigation board for viewing while navigating underwater, as can be seen in FIGS. 7A, 7C, 7F. The navigation boards 700 may have user interfaces for controlling and interacting with the display 1104, such as the buttons on the navigation boards 700 in FIG. 7C, 7E, for example. Other user controllable features for controlling the navigation board 700 may be possible, such as control pads, toggle switches and other user touch controlled features. As discussed above, the CPU 1110 may receive navigation information from the sensor 1102, convert the navigation information into graphics data, and provide the graphics data to the GPU 1112 for rendering a navigation board image on the display 1104. The navigation information can include sonar data generated by a sonar sensor 1102, which is provided as a sonar screen component 304 navigation indicator on a navigation board image rendered on the display 1104, as illustrated in FIG. 7B. The navigation board image may include a transparent compass integrated with the sonar screen component 304, for example. Additionally or alternatively, a physical compass component such as a magnetic compass or gyro compass may be provided as part of the navigation board 700 (illustrated in FIG. 7F). Using the navigation board image on the display 1104 of a navigation board 700, the diver can navigate through the water with enhanced situation awareness and highlighting of dangerous conditions as discussed above.

FIGS. 8A-B depict various diver propulsion devices 800 according to one aspect of this disclosure. In addition to diver navigation boards, diver undersea navigation devices also include diver propulsion devices (DPDs). DPDs are small propulsion vehicles which use propellers to expand the range of scuba divers underwater. The diver may grab two handles of the DPD 800 for propelling forward at a higher speed, with the propeller located on the bottom of the DPD 800. As discussed above, the higher speed of DPDs 800 may increase the risk of injuring others by an inadvertent collision, for example. Accordingly, even the diver that is unaware of their slightly incorrect pitch orientation could rapidly accidentally hit another diver or object. The improved navigation board images with integrated transparent compass and sonar or map display screen advantageously may timely alert the DPD 800 diver to such dangerous conditions. DPDs 800 range in size, from smaller instances that accommodate only one diver to larger instances that may even accommodate two or four divers. A typical smaller DPD 800 may have dimensions similar to a cube of 1 cubic foot while a larger DPD 800 may have dimensions similar to that of a jet ski.

The DPD 800 may comprise the computer based undersea navigation system described in FIGS. 11-12 or a similar system. The DPD 800 may comprise one or more batteries for powering the propeller, an onboard CPU 1110 coupled to the one or more memory devices, an onboard GPU 1112, and a waterproof display 1104. As illustrated in FIGS. 8A-8B, during undersea navigation, the diver can grasp the handles while propelling forward and using the navigation board image provided on the display 1104 for navigation. The DPD 800 can have a yoke or some other sort of control interface for the diver to adjust the current bearings of the DPD 800. A magnetic compass can be used to provide the current bearing navigation information to the CPU 1110 in order for the GPU 1112 to render the information on a transparent compass appearing on the display 1104. The DPD 800 may be made of aluminum for the hull and a suitable plastic such as polyvinyl chloride for other portions of the DPD. The DPD 800 comprises a suite of sensors 1102, which includes a variety of sensors depending on the functionality of the DPD. For example, the DPD 800 can have various sonar systems, such as forward and downward facing sonars 1102 which include sub-bottom profilers, side scan sonars, and synthetic aperture sonars. Additionally or alternatively, the DPD 800 can have a DVL and a gyro compass for generating rotational orientation information.

FIG. 9 is a graphical depiction of a wet submersible 900 according to one aspect of this disclosure. Maritime vehicles include drive submersibles (could be remotely controlled or controlled onboard), which includes wet submersible 900. In contrast to the diver navigation board 700 or DPD 800, the wet submersible 900 is a larger submarine vehicle with dimensions such as 20 feet in length, 7 feet in height, and 7 feet in width. The wet submersible 900 provides an open atmosphere where the divers inside the submersible are exposed to the water. The wet submersible 900 could accommodate several divers, including a pilot, navigator, and other divers. The wet submersible 900 may be propelled at high speeds, such as 5 knots, based on for example, propellers powered by one or more batteries. The wet submersible 900 could also be powered by diesel. The wet submersible 900 may comprise the computer based undersea navigation system described in FIGS. 11-12 or a similar system. The sensor suite 1102 of wet submersible 900 may include sonar sensors, cameras, DVLs, and inertial navigation sensors.

As discussed above, the sonar sensors may be configured for obstacle avoidance and may include sub-bottom profilers, side scan sonars, and synthetic aperture sonars. The cameras can include IR and thermal cameras for observing the ocean floor, for example. Other sensors may include GPS sensors. The sensors 1102 sense such navigation information and transmit the information to a sensor interface (not pictured in FIGS. 11 and 12). The CPU 1110 receives the navigation information from the sensor interface, converts the navigation information to graphics data, and provides the graphics data to the GPU 1112 for rendering on the display 1104. The wet submersible 900 may resurface periodically to recalibrate; that is, to accurately sense the location of the wet submersible 900 in the water column. Alternatively or additionally, a buoy of the wet submersible 900 can be floated up to the surface for readjusting the accuracy of the GPS data. The compass rotational orientation data can be provided by gyrocompasses, or magnetic compasses, or a combination of both.

FIG. 10 is a graphical depiction of a dry submersible 1000 according to one aspect of this disclosure. The dry submersible 1000 may be similar to the wet submersible 900, except that the dry submersible 1000 provides a dry pressurized environment. The dry submersible 1000 also may comprise the computer based undersea navigation system described in FIGS. 11-12 or a similar system.

Users or divers using the improved undersea navigation system of the present disclosure with the diver undersea navigation devices and maritime vehicles described with reference to FIGS. 7-10 may advantageously navigate through the water with better situational awareness as well as timely identification and emphasis of dangerous conditions. Users or divers viewing displays 1104 displaying navigation board images with integrated transparent compasses 100, 400, 500, 600 and sonar (or map) screen component 304 navigation indicators can spatially relate their location with their current bearings, which may include heading, pitch, and roll. The transparent nature of the transparent compasses 100, 400, 500, 600 enables their corresponding pitch indicators and roll indicators to be positioned within the interior of the transparent compasses 100, 400, 500, 600 for indication of current bearings information. In this connection, users or divers can readily and timely relate their current bearings with their current location, location in the water column, relative location of observed obstacles, or any combination or subcombination of the preceding.

In short, users or divers may spatially relate the navigation information indicated by the navigation indicators and the rotational orientation information together on the same navigation board image. With this enhanced situational awareness, users or divers may timely perceive the precise relative location of obstacles, for example. This can also facilitate corrective action to avoid dangerous conditions such as accidental collisions with such obstacles. Pitch indicators and roll indicators also may indicate and emphasize the criticality of a dangerous or potentially dangerous condition, as described above. Criticality could be indicated by changing a color or a shade of a color to correspond to the dangerous condition or risk of the dangerous condition. In this way, divers can be made aware of and avoid health risks based on timely alerts that their current bearing is or will lead to a health issue (e.g. medical danger from ascending too quickly). Similarly, divers can be made aware that their current bearing will cause a collision with another object. Highlighting these dangerous conditions enables timely corrective action. The transparency and consolidation of the pitch and roll indicators with the transparent compasses 100, 400, 500, 600 may also contribute to easier identification of dangerous conditions.

Turning now to FIGS. 11 and 12, the hardware used to implement the improved undersea navigation system of the present disclosure is described. FIG. 11 is a schematic diagram 1100 of a computer based undersea navigation system 1101 including a central processing unit in communication with a graphics processing unit, a plurality of sensors, and a display according to one aspect of this disclosure. As shown in FIG. 11, a CPU 1110 communicates with a GPU 1112 in a computer based undersea navigation system 10. The CPU 1110 and GPU 1112 can be on the same or different integrated circuit. The CPU 1110 comprises one or more processors, microprocessors, microcontrollers, and/or other suitable components. The CPU 1110 is coupled to one or more memory devices such as random access memory (RAM), read only memory (ROM), cache memory and/or any other suitable memory device for electrical communication. The GPU 1112 is also coupled to one or more memory devices, which could be the same as or different from the one or more memory devices coupled to the CPU 1110.

When the one or more memory devices are the same, the CPU 1110 and GPU 1112 may share data, such as in the context of multithreaded applications. In such applications, shared data is protected by locks called mutexes. The CPU 1110 includes user applications 1114 which provide control information to a shadow thread 1116. The shadow thread 1116 then communicates synchronization on sync and control information to the GPU driver 1120. The shadow thread 1116 also communicates with the host operating system 1118. User applications 1114 are any user process that runs on the CPU 1110, such as converting navigation information received from the suite of sensors on a maritime vehicle into graphics data. The suite of sensors refers to the sensors 1102, which can include sonar sensors, temperature sensors, pressure sensors, conductivity sensors, gyroscopes, doppler sensors or a combination thereof. The user applications 1114 spawn threads on the GPU 1112.

As shown in FIG. 11, the user level 1106 includes a shadow thread 1116 and the user applications 1114, while the kernel level 1108 includes a host operating system 1118, and the GPU driver 1120. Although the GPU driver 1120 is resident in the CPU 1110, the GPU driver 1120 is a driver for the GPU 1112. The GPU 1112 includes, in user level 1106, a gthread 1122 which sends control and synchronization messages to the operating system (pOS) 1124 and receives messages from the pOS 1124. A gthread 1122 is user code that runs on the GPU 1112, sharing virtual memory with the parent thread running on the CPU 1110. The pOS 1124 may be a relatively small operating system running on the GPU 1112 and is responsible for GPU exceptions. It is small relative to the host operating system 1118, as one example.

An eXtended Threaded Library or XTL is an extension to create and manage user threads on the GPU 1112. The GPU 1112 can execute such user threads to render a navigation board image on the display 1104 for undersea navigation. The display 1104 can be any suitable electric display, such as a liquid crystal display (LCD) mounted in a waterproof enclosure constructed of plexiglass, for example. This XTL library creates the shadow thread for each gthread and has library functions for synchronization. User applications offload computations to the graphics processing unit using an extension of a traditional multithreaded model such as:

xthread_create (thread, attr, gpu_worker,arg).

The gthread or worker thread created on the GPU 1112 shares virtual memory with the parent thread. It behaves in the same way as a regular thread in that all standard inter-process synchronization mechanisms, such as mutex and semaphore, can be used. At the same time, a new shadow thread is created on the CPU 1110. This shadow thread works as a proxy for exception handling units and synchronization between threads on the CPU 1110 and the GPU 1112.

FIG. 12 is a system diagram 1200 of the computer based undersea navigation system 1101 according to one aspect of this disclosure. As shown in FIG. 12, the GPU 1112 is coupled to the display 1104 (via a frame buffer 1216, for example) and the sensors 1102 are coupled to the CPU 1110. The undersea navigation computer system 1101 may include a hard drive 1202 and a removable medium 1204, coupled by a bus 1206 to a chipset core logic 1208. A keyboard and mouse 1210, or other conventional components, may be coupled to the chipset core logic 1208 via bus 1206. The core logic 1208 is coupled to the GPU 1112, via a bus 1212, and the CPU 1110 in one aspect. The GPU 1112 is also be coupled by a bus 1214 to the frame buffer 1216. The frame buffer 1216 may be coupled by a bus 1218 to a display screen 1104. In one embodiment, the GPU 1112 may be a multi-threaded, multi-core parallel processor using single instruction multiple data (SIMD) architecture. Pertinent computer-executable instructions may be stored in the one or more memory devices, which may be any suitable semiconductor, magnetic, or optical memory, including the main RAM memory 1220, and may be executed by the GPU 1110 and/or the GPU 1112.

FIG. 13 is a logic diagram 1300 of a method for undersea navigation with a maritime vehicle or a diver undersea navigation device, according to one aspect of the present disclosure. The method may be executed in a hardware environment disclosed in connection with FIGS. 11-12. According to the method, when the CPU 1110 executes instructions stored in the one or more memory devices, the CPU 1110 receives 1302 navigation information of the maritime vehicle from the plurality of sensors 1102 sensing navigation information (via the sensor interface). The CPU 1110 determines 1304 rotational orientation information of the maritime vehicle based on sensed navigation information. The CPU 1110 associates 1306 the rotational orientation information with navigation information displayed by the plurality of navigation indicators. The CPU 1110 converts 1308 the navigation information into graphics data. The CPU 1110 provides 1310 the graphics data to the GPU 1112 to render a navigation board image on a display 1104 coupled to the GPU 1112. In one aspect, the navigation board image comprises a plurality of navigation indicators to indicate the navigation information, and a compass comprising a plurality of rotational orientation indicators to indicate rotational orientation information.

Various operations of aspects are provided herein. In one aspect, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each aspect provided herein. Also, it will be understood that not all operations are necessary in some aspects.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising."

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Various aspects of the subject matter described herein are set out in the following numbered examples:

Example 1

An undersea navigation system for use with a maritime vehicle, the undersea navigation system comprising: a sensor interface to receive navigation information from a plurality of sensors configured to sense the navigation information; a display; a graphics processing unit coupled to the display; a processor coupled to the graphics processing unit; and a memory coupled to the processor, the memory storing instructions executable by the processor to: receive the navigation information from the sensor interface; and convert the navigation information into graphics data; and provide the graphics data to the graphics processing unit to render a navigation board image on the display, wherein the navigation board image comprises: a plurality of navigation indicators to indicate the navigation information, and a compass comprising a plurality of rotational orientation indicators to indicate rotational orientation information.

Example 2

The undersea navigation system of Example 1, wherein the plurality of sensors comprises a sonar sensor, a temperature sensor, a pressure sensor, a conductivity sensor, a gyroscope, or a combination thereof.

Example 3

The undersea navigation system of Example 2, wherein the sonar sensor is configured to transmit acoustic signals indicating the presence of obstacles.

Example 4

The undersea navigation system of Example 1, wherein the plurality of navigation indicators comprises a sonar display, a digital nautical chart, an air gauge indicator, an update indicator, a speed indicator, a locational indicator, or a water column depth gauge, or a combination thereof.

Example 5

The undersea navigation system of Example 1, wherein the rotational orientation information comprises pitch information that indicates an ascent rate, an ascent level, descent rate, or a descent level of the maritime vehicle, or a combination thereof.

Example 6

The undersea navigation system of Example 1, wherein the processor is further configured to change a color of the rotational orientation indicator when the rotational orientation information is greater than or equal to a predetermined threshold.

Example 7

The undersea navigation system of Example 1, wherein the rotational orientation information comprises roll information and heading information.

Example 8

The undersea navigation system of Example 7, wherein the plurality of rotational orientation indicators indicate the difference between an intended bearing and an actual bearing of the maritime vehicle, based on the rotational orientation information.

Example 9

A method of undersea navigation with a maritime vehicle, the method comprising:
receiving, by a processor coupled to a memory storing instructions executed by the processor, navigation information of the maritime vehicle from a plurality of sensors sensing navigation information; determining, by the processor, rotational orientation information of the maritime vehicle based on sensed navigation information; associating, by the processor, the rotational orientation information with navigation information displayed by the plurality of navigation indicators; converting, by the processor, the navigation information into graphics data; and providing, by the processor, the graphics data to a graphics processing unit to render a navigation board image on a display coupled to the graphics processing unit, wherein the navigation board image comprises: a plurality of navigation indicators to indicate the navigation information, and a compass comprising a plurality of rotational orientation indicators to indicate rotational orientation information.

Example 10

The method of undersea navigation of Example 9, further comprising: determining, by the processor, a difference between an intended bearing and an actual bearing of the maritime vehicle, based on the rotational orientation information.

Example 11

The method of undersea navigation of Example 10, further comprising: determining, by the processor, a relative location of a target that is relative to the actual bearing of the maritime vehicle, based on the rotational orientation information.

Example 12

The method of undersea navigation of Example 10, further comprising: changing, by the graphics processing unit, a color of a rotational orientation indicator of the compass based on the difference exceeding a predetermined threshold.

Example 13

The method of undersea navigation of Example 9, further comprising: changing, by the graphics processing unit, a color of a rotational orientation indicator of the compass based on a difference between the rotational orientation information and a predetermined threshold, wherein the rotational orientation information comprises one or more of pitch information, heading information, and roll information.

Example 14

The method of undersea navigation of Example 13, wherein changing a color of a rotational orientation indicator of the compass comprises changing an intensity of the color based on the difference between the rotational orientation information and the predetermined threshold.

Example 15

The method of undersea navigation of Example 13, wherein the pitch information indicates one or more of an ascent rate, an ascent level, descent rate, or a descent level of the maritime vehicle.

Example 16

An undersea navigation system for use with a diver undersea navigation device comprising: a plurality of sensors configured to sense navigation information; a display; a graphics processing unit coupled to the display; a processor coupled to the graphics processing unit and the plurality of sensors, wherein the processor is configured to control the plurality of sensors; and a memory coupled to the processor, the memory storing instructions executable by the processor to: receive the navigation information from the plurality of sensors; convert the navigation information into graphics data; and provide the graphics data to a graphics processing unit to render a navigation board image on the display, wherein the navigation board image comprises: a compass comprising a plurality of heading direction indicators, a current heading indicator, and a plurality of pitch indicators, wherein the plurality of pitch indicators indicate pitch information; a plurality of bearing indicators configured to display an intended bearing and an actual bearing of the diver; and a plurality of navigation indicators configured to display navigation information.

Example 17

The undersea navigation system of Example 16, wherein the heading direction indicators indicate four cardinal directions and a plurality of degrees of arc relative to an orientation of the diver.

Example 18

The undersea navigation system of Example 16, wherein the plurality of bearing indicators are further configured to display a difference between an intended bearing and an actual bearing, wherein the difference is determined by the processor based on the navigation information.

Example 19

The undersea navigation system of Example 16, wherein the plurality of pitch indicators changes color based on the difference between the pitch information and a predetermined threshold.

Example 20

The undersea navigation system of Example 19, wherein the plurality of pitch indicators change color based on the difference between the pitch information and a predetermined threshold comprises changing an intensity of the color.

The invention claimed is:

1. An underwater navigation system, the underwater navigation system comprising:
    a plurality of sensors to sense velocity and pressure;
    a sensor interface to receive navigation information from the plurality of sensors configured to sense the navigation information;
    a display;
    a graphics processing unit coupled to the display;
    a processor coupled to the graphics processing unit; and
    a memory coupled to the processor, the memory storing instructions executable by the processor to:
        receive the navigation information from the sensor interface; and
        convert the navigation information into graphics data; and
        provide the graphics data to the graphics processing unit to render a navigation board image on the display, wherein the navigation board image comprises:
            a plurality of navigation indicators to indicate the navigation information, and
            a compass comprising a plurality of rotational orientation indicators to indicate rotational orientation information, wherein the rotational orientation information comprises pitch information that indicates an ascent rate and a descent rate; and
        change a color of the plurality of rotation orientation indicators based on: at least one of the ascent rate and the descent rate is greater than or equal to a threshold; and a underwater depth level of a user of the underwater navigation system.

2. The underwater navigation system of claim 1, wherein the plurality of sensors comprises a sonar sensor, a temperature sensor, a pressure sensor, a conductivity sensor, or a gyroscope, or a combination thereof.

3. The underwater navigation system of claim 2, wherein the sonar sensor is configured to transmit acoustic signals indicating the presence of obstacles.

4. The underwater navigation system of claim 1, wherein the plurality of navigation indicators comprises a sonar display, a digital nautical chart, an air gauge indicator, an update indicator, a speed indicator, a locational indicator, or a water column depth gauge, or a combination thereof.

5. The underwater navigation system of claim 1, wherein the pitch information further indicates the underwater depth level of the user of the underwater navigation system.

6. The underwater navigation system of claim 1, wherein the processor is further configured to change a shade of the color of the plurality of rotational orientation indicators based on a level of danger to the user of the underwater navigation system.

7. The underwater navigation system of claim 1, wherein the rotational orientation information further comprises roll information and heading information.

8. The underwater navigation system of claim 7, wherein the plurality of rotational orientation indicators indicate the difference between an intended bearing and an actual bearing of a maritime vehicle, based on the rotational orientation information.

9. A method of underwater navigation with a maritime vehicle, the method comprising:
- receiving, by a processor coupled to a memory storing instructions executed by the processor, navigation information of the maritime vehicle from a plurality of sensors sensing navigation information;
- determining, by the processor, rotational orientation information of the maritime vehicle based on sensed navigation information;
- associating, by the processor, the rotational orientation information with navigation information displayed by a plurality of navigation indicators;
- converting, by the processor, the navigation information into graphics data; and
- providing, by the processor, the graphics data to a graphics processing unit to render a navigation board image on a display coupled to the graphics processing unit, wherein the navigation board image comprises:
  - the plurality of navigation indicators to indicate the navigation information, and
  - a compass comprising a plurality of rotational orientation indicators to indicate rotational orientation information, wherein the rotational orientation information comprises pitch information that indicates an ascent rate and a descent rate; and
- changing, by the processor, a color of the plurality of rotation orientation indicators based on: at least one of the ascent rate and the descent rate is greater than or equal to a threshold; and a underwater depth level of the maritime vehicle.

10. The method of underwater navigation of claim 9, further comprising:
- determining, by the processor, a difference between an intended bearing and an actual bearing of the maritime vehicle, based on the rotational orientation information.

11. The method of underwater navigation of claim 10, further comprising:
- determining, by the processor, a relative location of a target that is relative to the actual bearing of the maritime vehicle, based on the rotational orientation information.

12. The method of underwater navigation of claim 10, further comprising:
- changing, by the graphics processing unit, a shade of the color of a rotational orientation indicator of the plurality of rotation orientation indicators based on a level of danger to the maritime vehicle.

13. The method of underwater navigation of claim 9, wherein the rotational orientation information further comprises heading information and roll information.

14. The method of underwater navigation of claim 13, wherein changing the color of plurality of rotation orientation indicators comprises changing an intensity of the color.

15. The method of underwater navigation of claim 13, wherein the pitch information further indicates the underwater depth level of the maritime vehicle.

16. An underwater navigation system for use with a diver undersea navigation device comprising:
- a plurality of sensors configured to sense navigation information;
- a display;
- a graphics processing unit coupled to the display;
- a processor coupled to the graphics processing unit and the plurality of sensors, wherein the processor is configured to control the plurality of sensors; and
- a memory coupled to the processor, the memory storing instructions executable by the processor to:
  - receive the navigation information from the plurality of sensors;
  - convert the navigation information into graphics data; and
  - provide the graphics data to the graphics processing unit to render a navigation board image on the display, wherein the navigation board image comprises:
    - a compass comprising a plurality of heading direction indicators, a current heading indicator, and a plurality of pitch indicators, wherein the plurality of pitch indicators indicate pitch information that indicates an ascent rate and a descent rate;
    - a plurality of bearing indicators configured to display an intended bearing and an actual bearing of the diver; and
    - a plurality of navigation indicators configured to display navigation information; and
  - change a color of the plurality of pitch indicators based on: at least one of the ascent rate and the descent rate equaling or exceeding a threshold; and a underwater depth level of a user of the underwater navigation system.

17. The underwater navigation system of claim 16, wherein the heading direction indicators indicate four cardinal directions and a plurality of degrees of arc relative to an orientation of the diver.

18. The underwater navigation system of claim 16, wherein the plurality of bearing indicators are further configured to display a difference between an intended bearing and an actual bearing, wherein the difference is determined by the processor based on the navigation information.

19. The underwater navigation system of claim 16, wherein the compass further comprises a plurality of roll indicators to indicate roll information, and wherein the plurality of roll indicators change color based on the difference between the roll information and a roll threshold.

20. The underwater navigation system of claim 19, wherein the change of the color of the plurality of roll indicators comprises a change to an intensity of the color.

* * * * *